N. SLEEMAN,
Assignor, by mesne assignments, to NATIONAL GAS SAVING COMPANY.
GAS REGULATOR.
No. 10,116. Reissued May 16, 1882.
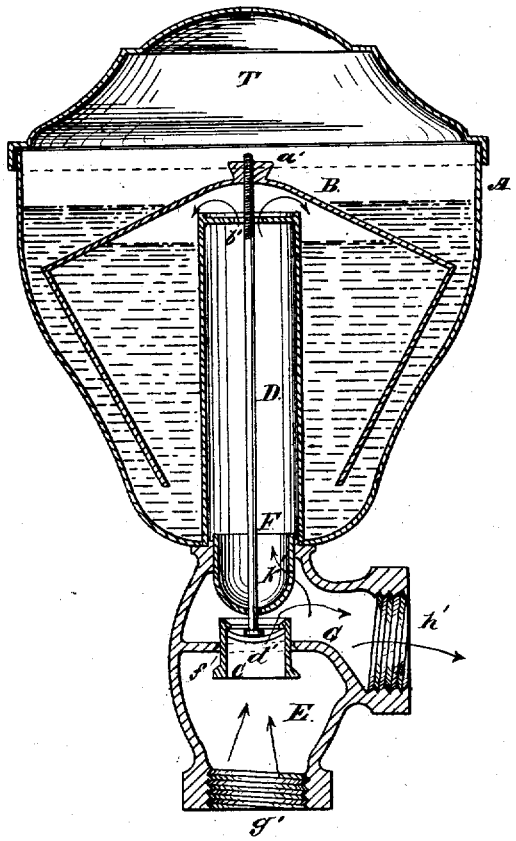
WITNESSES:
Henry Eichling
P. H. Emmilya
INVENTOR
Nathaniel Sleeman
BY W. T. Fitch
ATTORNEY
N. PETERS, Photo-Lithographer, Washington, D. C.

UNITED STATES PATENT OFFICE.

NATHANIEL SLEEMAN, OF BIRMINGHAM, ASSIGNOR, BY MESNE ASSIGNMENTS, TO NATIONAL GAS SAVING COMPANY, OF ANSONIA, CONN.

GAS-REGULATOR.

SPECIFICATION forming part of Reissued Letters Patent No. 10,116, dated May 16, 1882.

Original No. 219,990, dated September 23, 1879. Application for reissue filed April 17, 1882.

*To all whom it may concern:*

Be it known that I, NATHANIEL SLEEMAN, of Birmingham, county of New Haven, State of Connecticut, have invented a new and Improved Gas-Regulator, of which the following is a specification.

The drawing represents a vertical section of the regulator.

The object of this invention is to furnish an automatic gas-regulator of superior accuracy and efficiency to any other now in use.

In the drawing, A represents the metallic case or shell, preferably somewhat conical in form—that is, of greater diameter at the top than at the bottom.

B is a float inclosed in the shell A, and conforming somewhat with the shape of the shell and its top T.

Projecting upward centrally through the bottom of the shell, and firmly secured thereto, is the tube D, whose upper end is fully open, and whose sides are drawn inward at the lower end in such a manner as to make the end hemispherical, and which end properly projects downward into the globe E. This end is centrally pierced with a hole for the admission of the valve-stem F, which passes up through it, and is screwed into the nut $a'$ on the apex of the float. The guides $b'$ serve to retain the valve-rod centrally in the tube.

The valve C is a deep ring, in which the valve-rod is centrally secured to the cross-bars $d'$. The upper rim of the valve is beveled inwardly to fit closely against and upon the end of the tube D, and the lower rim is provided with a sloping exterior flange that fits closely, when the valve is raised, within the beveled opening $f'$ in the center of the diaphragm G of the globe. By this construction I am enabled to seal the valve without the use of glycerine or other liquid, the advantage of which is that in gas-regulators where the valve is sealed by a liquid the gas in its passage through the machine is compelled to pass over the sealing-liquid, the effect of which is to render it so thick and gummy that the machine becomes in a very short time inoperative. When ready for use the shell or case is partly filled with glycerine for the proper support and adjustment of the float and valve. The gas enters the regulator through the opening $g'$ and passes out through the opening $h'$.

It will be seen that the valve is so arranged and constructed as to offer a minimum resisting-surface to the pressure of the entering gas, so that the gas-pressure upon it is never enough to force it up and close it, yet its construction is such that it can adapt itself to a wide range of varying pressure and be made to entirely cut off the entering gas, if desired.

All other gas-regulators of which I have knowledge are chiefly affected or controlled in their operations by the size of their valve. The larger the valve the more effect upon it has the pressure of the gas entering from below.

The ordinary flat valve is serviceable in combination with a flat-topped float, or with a float with perpendicular sides, where the pressure of gas in the main varies but little, and a regulator provided with these will work automatically within narrow limits; but when the pressure rapidly varies, as it commonly does in the evening, from four or five tenths of an inch at one extreme to three or four inches at the other, this style of valve and float fail to properly and automatically regulate the flow to the burners, unless frequent personal attention is given to adjust them with the weights, screws, or levers with which they are usually provided for such occasions. All these difficulties are avoided by the combination of my annular valve C with the float B. The valve, *per se*, is hardly affected by the pressure of the gas, while the float is so constructed that its oscillations or vibrations under varying pressures, and the consequent flickerings of the lights it controls, are reduced to a minimum. Its sloping sides afford it a hold in the glycerine in which they are immersed that makes it slower of motion, and the deeper its cover or top is immersed the less lifting-surface does it offer to the gas, in which respect it differs radically from the flat-topped floats, that, even to the point, almost, of complete immersion, present a constant lifting-surface, and are therefore imperfect in their action. The relative position of this float and valve may be adjusted by screws at either end of the valve-rod, and also by the quantity of glycerine or other fluid introduced into the case or shell, an increased amount of which will reduce the lifting-surface of the float.

It will be seen that the gas does not pass through the body of the machine, and that only enough passes up the tube to afford a pressure-column under the float for regulating the flow to the lights. With an increased pressure within the float the glycerine within is proportionately depressed while it rises over the cover. As the pressure diminishes the inclosed glycerine rises and the cover emerges in proportion from the liquid on its top. Thus it will be seen that the connecting-valve is regulated in its movements entirely by the float, and in a more efficient manner than in regulators of the ordinary kind.

The small orifice $k'$ in the side of D is for the upward passage of the gas to the space under the float.

Having thus described my invention, what I claim as my invention, and desire to secure by Letters Patent, is—

1. In a gas-regulator, the combination, with the shell A, of the conical-sided and arch-topped float B and the annular valve C, mounted on rod F, located longitudinally of tube D, which has orifice $k'$, and having inwardly-beveled upper rim and sloping exterior flange on lower rim, to fit respectively on valve-seats on lower end of said tube D and in aperture $f'$ of diaphragm G of globe E, substantially as and for the purpose specified.

2. In a gas-regulator, the combination of a shell, A, float B, tube D, stem F, and globe E, having diaphragm G, of the double annular valve C, substantially as described.

3. In a gas-regulator, the combination, with a float, B, hemispherically-pointed tube D, provided with orifice $k'$, and diaphragm G, provided with aperture $f'$, of the annular double valve C, substantially as described.

NATHANIEL SLEEMAN.

Witnesses:
P. B. VERMILYA,
A. G. W. VERMILYA.